Sept. 4, 1928.

E. W. BULLOCK ET AL 1,683,524

INDEXING MECHANISM

Filed July 18, 1921

INVENTORS
*Edward W. Bullock.*
*George H. Bryan.*
BY
their ATTORNEY.

Sept. 4, 1928.

E. W. BULLOCK ET AL 1,683,524

INDEXING MECHANISM

Filed July 18, 1921

INVENTORS
Edward W. Bullock.
George H. Bryan.
BY
Their ATTORNEY.

Sept. 4, 1928.

E. W. BULLOCK ET AL

1,683,524

INDEXING MECHANISM

Filed July 18, 1921

INVENTORS
Edward W. Bullock
George H. Bryan
BY
their ATTORNEY.

Patented Sept. 4, 1928.

1,683,524

UNITED STATES PATENT OFFICE.

EDWARD W. BULLOCK AND GEORGE H. BRYAN, OF ROCHESTER, NEW YORK, ASSIGNORS TO GLEASON WORKS, OF ROCHESTER, NEW YORK, A CORPORATION OF NEW YORK.

INDEXING MECHANISM.

Application filed July 18, 1921. Serial No. 485,505.

This invention has to do with mechanism for effecting relative indexing movement between a tool and its work, such, for example, as employed in gear cutting machines, the chief object of the invention being to provide a simple and effective mechanism of the above character having a minimum number of parts, and hence a low manufacturing cost. A further object is to provide such an indexing mechanism adapted, for example, for use with a gear cutting machine of the type in which the blank spindle is given an oscillating generating movement during the cutting of the teeth. Still a further object is to provide a self contained mechanism of this variety capable of being driven by the oscillating generating movement of the blank spindle itself, and thus obviating the necessity for an outside driving connection with other parts of the machine to which power is applied. To these and other ends the invention consists in certain improvements and combinations of parts, all as will be hereinafter more fully described, the novel features being pointed out in the claims at the end of the specification.

In the drawings.

Similar reference numerals throughout the several views indicate the same parts.

This invention, in the preferred embodiment thereof selected at the present time for purpose of illustration, is applied to a gear cutting machine such as disclosed in United States Letters Patent, Serial No. 1,385,200, granted to us jointly July 19, 1921, for gear cutting machines, of which the present application is a division.

As the gear cutting machine in conjunction with which the indexing mechanism is used in the present instance is fully shown and described in the above Letters Patent, it is sufficient for present purposes to say that such machines comprise, generally speaking, a main frame 10 on which is supported a cutter 11 of the face milling type, well known in the art. The cutter is supported for rotation on its own spindle to effect cutting operation of its teeth on the blank 12, and the cutter spindle is journaled in a frame or carriage 13 supported for oscillating movement on the main frame about an axis parallel with but eccentric to the cutter spindle. It is apparent from this construction that the cutter rotates on its own axis and is also given an oscillating generating movement with the frame 13 about a eccentric axis so that the cutter not only rotates but is bodily oscillated substantially in a plane normal to its own axis and tangent to the root cone of the gear to be cut to generate the tooth profile. In addition, after each to and fro oscillation, the cutter is withdrawn parallel with its axis clear of the blank to provide for an indexing movement of the latter preparatory to cutting the next tooth, as fully described in the said Letters Patent.

The gear blank is fixed on the inner end of a spindle 14 rotatably supported in a generating element or sleeve 15 supported for oscillation in spaced bearings 16 and 17 on a head 17ª slidably adjustable as shown on the main frame. During the cutting operation the blank is given an oscillating or rolling motion about its own axis, corresponding with the oscillation of the cutter, for the purpose of generating the tooth profile as well understood in the art, for which purpose there is clamped to the sleeve 15, between the said bearings, an arm 18 carrying at its outer end a gear sector 19 meshing with a gear sector 20 on an arm 21 carried by the oscillating frame 13 of the cutter. It is apparent from this construction that as the frame 13 of the cutter is oscillated to oscillate the cutter, the sleeve 15 is correspondingly oscillated about its own axis through the connecting gear sectors described. Sleeve 15 is normally locked to the spindle of the gear blank, to oscillate the latter, through the indexing mechanism on the outer ends of these parts, it being understood that the sleeve and spindle are disconnected and moved relatively to each other to index the blank in each to and fro oscillation, as hereafter described.

Rotatably engaged in a circular recess or groove in sleeve 15 is an arm 22 fixed on one end of a shaft 23 slidably carried in auxiliary bearings 16 and 17. Means are provided of any suitable character for adjusting shaft 23 longitudinally in its bearing to adjust the sleeve and blank spindle toward and from the cutter to properly position the blank relative to the latter, the gear sector arm 18 being unclamped during such adjustment. On the other end of the shaft 23 is carried a relatively stationary housing 24 within which is contained the indexing mechanism now to be described.

Figure 1:
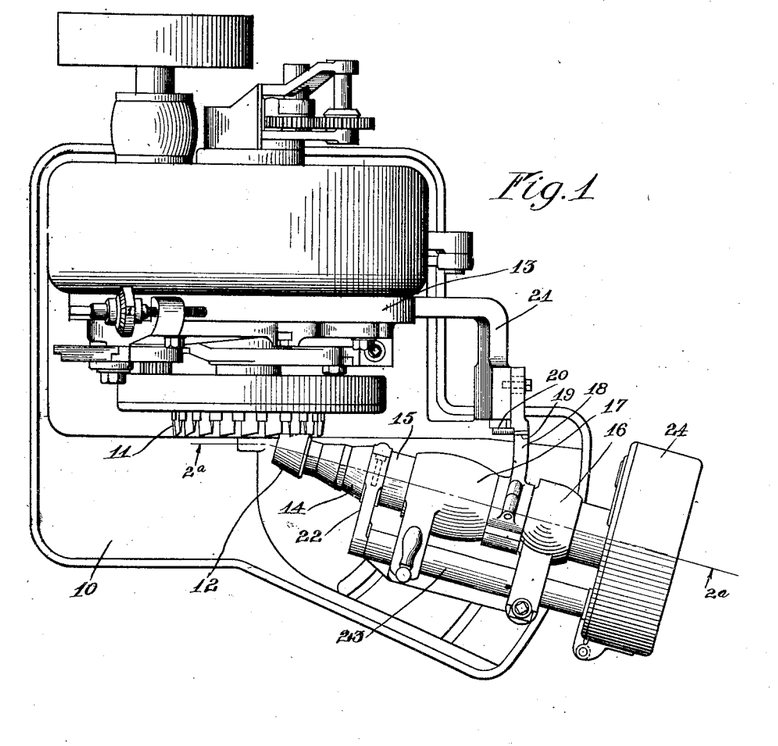
Figure 1 is a top plan view of a gear cutting machine, having the invention applied thereto.
Figure 2:
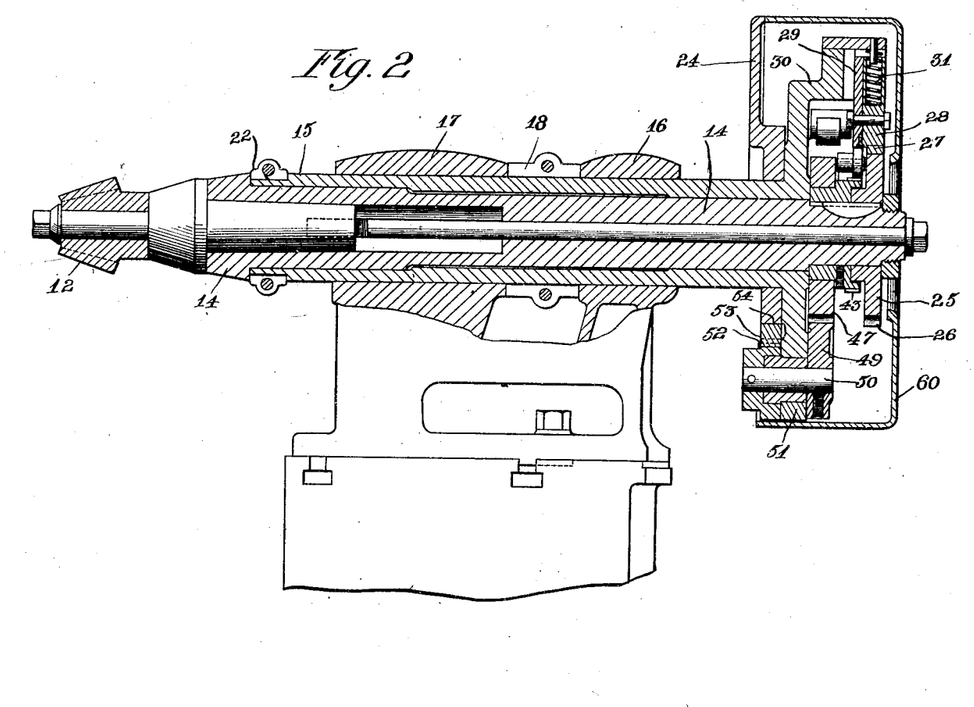
Figure 2 is an enlarged sectional elevation on the line 2ª—2ª of Figure 1.
Figures 3, 5:
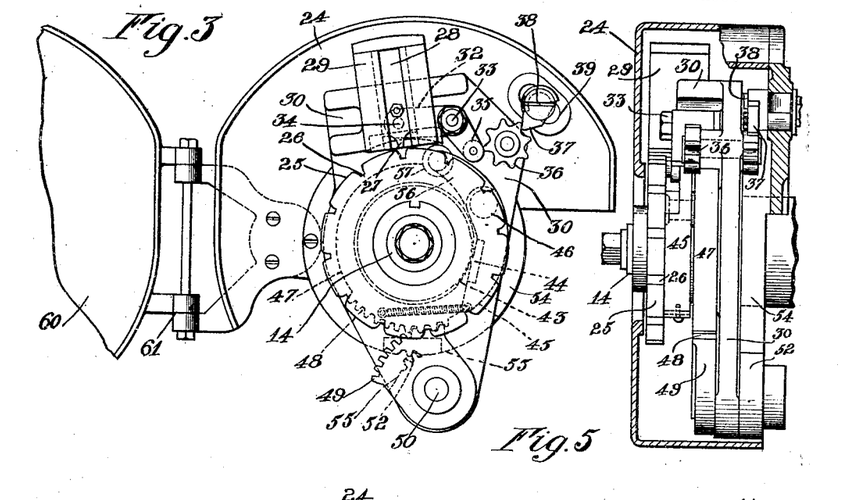
Figures 3 and 4 are end elevations of the indexing mechanism showing the parts in different operating positions.
Figure 5 is a side elevation, partly in section, of the indexing mechanism, as viewed from the right in Figure 3.
Figures 4, 6:
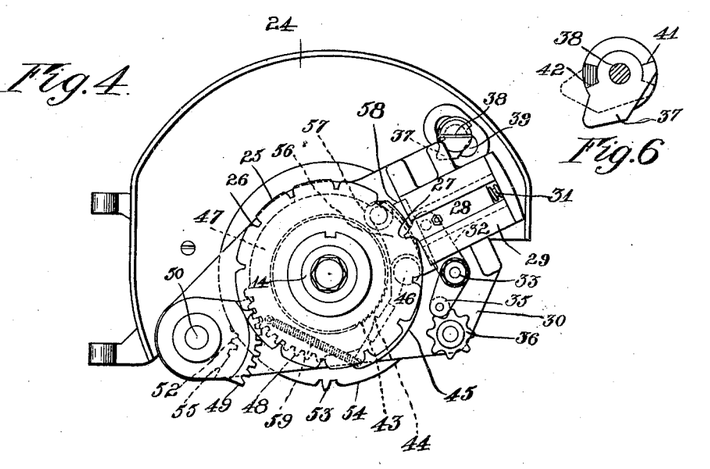
Figure 6 is a detail view of a dog shown in Figure 3.

The indexing mechanism normally locks the oscillating sleeve 15 to the spindle of the blank for oscillating the latter to generate the teeth, comprising for this purpose a locking disk 25, Figures 3 and 4, fixed on the blank spindle and provided in its periphery with a series of spaced notches 26 corresponding in number to the number of teeth to be cut in the blank. For engagement with these notches there is provided a locking pawl 27 carried at the lower end of a block 28 sliding in guideways 29 in a plate 30 fixed on the end of sleeve 15. A spring 31 normally urges the pawl into engagement with the notches of the disk, as shown in the drawings, and means are provided for moving the pawl out of engagement with the notches to release the blank spindle comprising a lever 32 pivotally supported at 33 on the plate 30. One arm of this lever is pivotally connected as at 34 with the block 28, the other end or tail piece of the lever carrying a roller 35 engaging with the teeth of a star wheel 36 rotatably supported on the plate. There is provided in position to engage with the teeth of the star wheel during oscillating movement of plate 30, a relatively stationary member or dog 37 pivotally supported on a stud 38 adjustably fixed in a slot 39 in the housing 24. Shoulders 41 and 42 on the dog provide for limited movement of the latter so that while it is held positively in the full line position shown in Figures 3 and 6 for actuating the star wheel in one direction of movement of the latter, it is arranged to yield to permit the passage of the star wheel in the other direction without actuating it. It is apparent from this construction that as sleeve 15 and its plate 30 are oscillated in a clockwise direction, Figure 3, star wheel 36 engaging dog 37 is rotated and oscillates lever 32, thereby raising locking pawl 27 sufficiently to clear the adjacent notch in the locking disk 25 so that the generating sleeve and blank spindle are disconnected.

Means are provided for effecting relative movement between the generating sleeve and blank spindle, while disconnected as described above, for indexing the blank, comprising a ratchet wheel 43 fixed on the spindle, with the teeth of which cooperates a ratchet pawl 44 on a lever 45 pivotally supported at 46 on an actuating member or carrier plate 47 rotatably supported on the spindle. Carrier 47 is provided over a portion of its periphery with a gear sector 48 with which meshes a second gear sector 49 fixed on one end of a short spindle 50 pivotally carried in the plate 30. On the other end of spindle 50 is fixed an additional gear sector 52 the teeth of which are arranged to engage, during oscillation of plate 30, with a stationary device or tooth 53 formed in a circular portion 54 of the stationary housing 24. As appears in Figures 3 and 4, gear sector 52 is formed on either side of the teeth thereof with curved portions 55 adapted to lock with the circular portion 54 of the stationary housing, as the sector is swung from side to side by engagement with the stationary tooth 53. It is apparent from this construction that as plate 30 is oscillated from the position shown in Figure 4 to that of Figure 3, sector 52 engages with the stationary tooth 53 and is rotated on its spindle through an angle for rotating sector 49 connected therewith and thereby rotating carrier 47 to idly advance ratchet pawl 44 to position for subsequent engagement with ratchet wheel 43 to turn the blank spindle. As plate 30 is oscillated in the opposite direction, the motion of the above parts is reversed and the ratchet pawl engages the ratchet wheel to positively turn the blank spindle during the time that the locking dog 27 is disengaged from the locking disk.

Lever 45 carrying the ratchet pawl is extended beyond its pivotal point as at 56 to form a tail piece provided with a roller 57 arranged for engagement with a cam plate 58 carried by block 28 adjacent the locking pawl 27. When the latter is in engaging relation with the locking disk, plate 58 bearing on roller 57 normally maintains ratchet pawl 44 out of position for engagement with the ratchet wheel and when the locking pawl is moved to release the locking disk, plate 58 clears roller 57 and permits the ratchet pawl to engage with its wheel, the pawl lever 45 being urged to engaging position by means of a spring 59 fixed to the lever and to its carrier 47. The ratchet pawl can thus engage its ratchet wheel for relatively moving the generating sleeve and blank spindle only while the locking pawl is out of engagement with its locking disk. A cover plate 60 for the housing 24 is preferably provided and pivotally supported as at 61 for movement to open and closed position.

In operation with the parts assembled and arranged as shown, as generating sleeve 15 is oscillated from the position shown in Figure 4 to that of Figure 3, the generating sleeve and blank spindle are locked together by engagement of the locking pawl 27 with locking disk 25 so that these parts move as one to effect the cutting of a tooth. During such movement the stationary tooth 53, through the gear sectors 49 and 52, oscillates the carrier 47 in the manner described to oscillate the ratchet pawl 44 supported on the carrier, the pawl being thus moved idly to position preparatory for an active stroke. When the generating sleeve and its plate 30 reach the position shown in Figure 3 and begin to oscillate in the opposite direction, star wheel 36, engaging the stationary member or dog 37 is partially rotated and its teeth oscillate lever 32, raising pawl 27 out of engagement with the locking disk, thereby releasing the locking connection between the sleeve and spindle. Such movement of the locking pawl and its block 28 releases member 45 carrying the ratchet pawl so that the latter may be moved by its spring 59 into engagement with the ratchet wheel. At this time the stationary tooth 53 is engaged by gear sector 52, and through the means described oscillates the ratchet pawl in a positive direction thereby oscillating the blank spindle relative to the generating sleeve. The locking pawl 27 is disengaged by its trip means before reaching the next notch in the locking disk, so that it rides along the surface of the latter and drops into the next notch thereby simultaneously disconnecting the ratchet pawl and ratchet sleeve and locking the sleeve and spindle together. The adjustment of the mechanism for cutting gears of different dimensions is conveniently made by removing the locking disk 25 and substituting a different one, this being made easy of accomplishment by detachably securing the disk adjacent the outer end of the blank spindle.

The mechanism thus advantageously utilizes the generating oscillation or roll required by the blank spindle in generating the tooth profile for indexing the blank, thus obviating a separate operating connection with a source of power. It is accurate and reliable in operation and compact and self-contained in character, and in addition to the fact that no separate driving connection is required, it is itself simple in construction, requiring but few parts, so that its manufacturing cost is low.

We claim as our invention:

1. In a gear generating machine, the combination with a generating sleeve and means for imparting an oscillatory motion thereto, of a blank spindle rotatable within the sleeve, locking means connecting the blank spindle and sleeve and oscillating with the latter, a stationary member arranged for engagement by the locking means during oscillation thereof for releasing the same, a stationary device, and means moved by said oscillating means and engaging said device for effecting rotation of the blank spindle when thus released to effect indexing.

2. In a gear generating machine, the combination with a blank spindle and an oscillating element for imparting generating movement to the spindle, of locking means connecting said spindle and element for normally oscillating said parts together, stationary means for engagement by said locking means during the oscillation of said parts for releasing said locking means, mechanism moved by said oscillating element for moving the blank spindle relatively to said element, and stationary means arranged for engagement by said mechanism during movement of the latter for actuating said mechanism during the release of said locking means.

3. In a gear generating machine, the combination with a generating sleeve and means for imparting an oscillatory movement thereto, of a blank spindle rotatable within the sleeve, locking means connecting the blank spindle and sleeve, means for releasing the locking means during oscillation of the sleeve, and mechanism for moving the blank spindle independently of the sleeve comprising an actuating member and a gear segment movable therewith, a second gear segment pivotally carried by the sleeve and meshing with the aforementioned gear segment, and a stationary device which actuates said pivoted gear segment as it is moved past the stationary member to effect indexing movement of said spindle.

4. In a gear generating machine, the combination with a generating sleeve and means for imparting an oscillatory movement thereto, of a blank spindle rotatable within the sleeve, locking means connecting the blank spindle and sleeve, instrumentalities for releasing the locking means during oscillation of the sleeve, and mechanism for moving the blank spindle independently of the sleeve comprising a ratchet wheel fixed to the blank spindle, a ratchet pawl cooperating therewith, a carrier for the ratchet pawl, a gear segment movable with said carrier, a second gear segment meshing with the aforementioned gear segment and pivotally carried by the sleeve, and a stationary member which actuates said pivoted gear segment as it is moved past the stationary member to effect indexing rotation of said spindle.

5. In a gear generating machine, the combination with a generating sleeve and means for imparting an oscillatory movement thereto, of a blank spindle rotatable within the sleeve, a notched disk carried by the blank spindle, a plate mounted on the sleeve, a locking pawl movably mounted on said plate and normally engaging a notch of said disk, a ratchet wheel also carried by the blank spindle, a ratchet pawl normally disengaged from said ratchet wheel, and means acting automatically to disengage said locking pawl and simultaneously permit the ratchet pawl to engage said ratchet wheel.

6. In a gear generating machine, the combination with a generating sleeve and means for imparting an oscillatory movement thereto, of a blank spindle rotatable within the sleeve, a notched disk carried by the blank spindle, a plate mounted on the sleeve, a locking pawl movably mounted on said plate and normally engaging a notch of said disk, a ratchet wheel also carried by the blank spindle, a ratchet pawl normally disengaged from said ratchet wheel, and operative connections between the locking and ratchet pawls whereby releasing the locking pawl serves to permit the ratchet pawl to engage its wheel and reengagement by the locking pawl moves the ratchet pawl out of engagement.

7. In a gear generating machine, the combination with a generating sleeve and means for imparting an oscillatory movement thereto, of a blank spindle rotatable within the sleeve, a notched disk carried by the blank spindle, a plate mounted on the sleeve, a locking pawl movably mounted on said plate and normally engaging a notch of said disk, a ratchet wheel also carried by the blank spindle, a ratchet pawl normally disengaged from said ratchet wheel, and operative connections between the locking and ratchet pawls whereby releasing the locking pawl serves to permit the ratchet pawl to engage its wheel and reengagement by the locking pawl moves the ratchet pawl out of engagement, a gear segment to which the ratchet pawl is connected, a cooperating gear segment pivoted on said plate, and a stationary member arranged to engage the last mentioned gear segment to effect indexing rotation on said spindle.

8. In a gear generating machine, the combination with a generating sleeve and means for imparting an oscillatory movement thereto, of a blank spindle rotatable within the sleeve, locking means connecting the blank spindle and sleeve comprising a notched disk fixed to the blank spindle, a plate movable with the said sleeve, a locking pawl movably mounted on said plate and arranged to engage the notches in said disk, and means for releasing the locking pawl comprising a tail piece on the locking pawl, a star wheel on said plate cooperating with said tail piece to move it, and a stationary member in the path of the star wheel.

9. In a gear generating machine, the combination with a generating sleeve and means for imparting an oscillatory movement thereto, of a blank spindle rotatable within the sleeve, a notched disk carried by the blank spindle, a plate mounted on the sleeve, a locking pawl movably mounted on said plate and normally engaging a notch of said disk, a ratchet wheel also carried by the blank spindle, a ratchet pawl normally disengaged from said ratchet wheel, a tail piece on the ratchet pawl, a portion on the locking pawl engaging said tail piece and acting to control the position of the ratchet pawl whereby release of the locking pawl serves to permit the ratchet pawl to operate, and reengagement of the locking pawl moves the ratchet pawl out of engagement, and means for releasing the locking pawl beforementioned comprising a tail piece on the locking pawl, a star wheel on said plate cooperating with said tail piece to move it, and a relatively stationary member in the path of the star wheel.

10. In apparatus of the class described, the combination of a support, a work spindle rotatably mounted on said support, a tool, means for causing relative movement between said tool and work spindle support, means for rotating said work spindle in opposite directions, and means carried entirely by said work spindle support for indexing said work spindle.

11. In apparatus of the class described, the combination of a tool, a support, a pair of connected members rotatably mounted on said support, means for rolling said members relative to said tool, one of said members carrying a work piece, and means operating periodically to disconnect the work piece carrying member from said other member and connect it to said support, to permit relative movement between said members.

12. In apparatus of the class described, the combination of a support, a pair of members rotatably mounted on said support, a notched element carried by one of said members, means for oscillating the other member, a dog slidably mounted on said oscillatable member and arranged successively to engage the notches of said element to connect said members together, and means operating during movement of the oscillatable member in one direction to disengage said dog from one of said notches and position it for engagement with the next notch.

13. In apparatus of the class described, the combination of a frame, a support slidably mounted on said frame, a pair of members mounted on said support to rotate together and relative to each other, and means for causing relative movement between said members, said means comprising a notched element carried by one of them, means for oscillating the other member, a dog movably mounted on said oscillatable member and arranged successively to engage the notches of said element to connect said members together, and means carried by said support and operating during each movement of the oscillatable member in one direction to trip said dog, whereby it is disengaged from one of said notches and position it for engagement with the next notch.

14. In apparatus of the class described, the combination of a support, a tool, a pair of connected members rotatably mounted on said support, one of said members carrying a work-piece, means for rolling said members relative to said tool, and means, including a cam, operating periodically to disconnect the work-piece carrying member from said other member and connect it to said support to permit relative movement between said parts.

15. In apparatus of the class described, the combination of a support, a tool, a pair of connected members rotatably mounted on said support, one of said members being arranged to carry a work-piece, means for rolling said members, relative to said tool, and means, including a pivoted cam, operating periodically to disconnect the work-piece carrying member from said other member and connect it to said support to permit relative movement between said members.

16. In apparatus of the class described, the combination of a support having a part adjustable thereon, a tool, a pair of members rotatably mounted on said adjustable part, one of said members being arranged to carry a work-piece, means for rolling the other member, and devices carried by said rolling member and said adjustable part for alternately connecting the work-piece carrying member to said adjustable part and said rolling member to cause relative movement between said members.

17. In apparatus of the class described, the combination of a support, a pair of members rotatably mounted on said support, means for oscillating one of said members, devices operatively connected together and movably carried by said oscillatable member and said support, respectively, and means arranged to engage one of said devices and control their engagement and disengagement with the other member, whereby the latter is alternately connected to said support and said oscillatable member.

18. In apparatus of the class described, the combination of a support, a pair of members rotatably mounted on said support, means for oscillating one of said members, devices operatively connected together and movably carried by said oscillatable member and said support, respectively, and a cam arranged to engage one of said devices and control their engagement and disengagement with the other member, whereby the latter is alternately connected to said support and said oscillatable member.

19. In apparatus of the class described, the combination of a support, a pair of members rotatably mounted on said support, means for oscillating one of said members, devices operatively connected together and movably carried by said oscillatable member and said support, respectively, and a pivoted cam arranged to engage one of said devices and control their engagement and disengagement with the other member, whereby the latter is alternately connected to said support and said oscillatable member.

20. In a gear generating machine, the combination with a tool support and a tool mechanism mounted thereon, of a gear blank support, a blank spindle journaled in said support, an oscillatory bed on which one of said supports is mounted, a gear segment having a fixed relation to the tool mechanism, a second gear segment movable on the stationary segment and normally fixedly connected to the blank spindle, and indexing mechanism operating automatically to release the second gear segment from the blank spindle and index the gear blank spindle when the oscillatory bed reaches a predetermined position.

21. In a gear generating machine, the combination with a tool support and a tool mechanism mounted thereon, of a blank support, an oscillatory sleeve journaled in said blank support, a blank spindle mounted in said sleeve and normally locked thereto, a movable bed on which one of said supports is mounted, means for moving said bed and simultaneously oscillating said sleeve to generate the tooth profiles and means whereby the movement of said sleeve unlocks the blank spindle from the sleeve and effects indexing movement of the blank spindle at predetermined intervals.

22. In a gear generating machine, the combination with a tool support and a tool mechanism mounted thereon, of a gear blank support, an oscillatory sleeve journaled in said blank support, a blank spindle mounted in the sleeve, an oscillatory bed on which one of said supports is mounted, a gear segment having a fixed relation to the tool mechanism, a second gear segment movable on the first segment and connected to said sleeve, and indexing mechanism including means whereby the relative motion between the sleeves and the blank support affords the power for indexing the blank spindle.

23. In a gear generating machine, the combination with a tool support and a tool mechanism mounted thereon, of a gear blank support, an oscillatory sleeve journaled therein, a blank spindle mounted in the sleeve and normally fixedly connected thereto, a member having a fixed relation to the tool mechanism, a second member adapted to roll on the first and fixedly connected to the sleeve, and indexing mechanism including means carried wholly by the blank support and acting automatically to control and effect a relative indexing movement between the blank spindle and sleeve when the latter reaches a predetermined position.

24. In a gear generating machine, the combination with a tool support and a tool mechanism mounted thereon, a gear blank support, a blank spindle journaled in said support, and means for effecting a relative rolling movement between the tool mechanism and blank spindle comprising a movable bed on which one of said supports is mounted, a pair of gear segments movable on one another, of means for indexing the blank spindle comprising an index plate fixed on the blank spindle, means normally locking the second gear segment to the index plate comprising a movable locking dog having an extension thereon, a relatively stationary member which engages said extension to release the index plate when the blank spindle reaches a predetermined position, a resilient means for holding the dog in locking position, and instrumentalities actuated by the movement of said movable segment for automatically turning the blank spindle relative to said segment when the dog is in released position.

25. In a gear generating machine, the combination with a tool mechanism, a blank spindle and means for producing a relative rolling movement between the tool mechanism and blank spindle, of means for locking the blank spindle to partake of the rolling movement during cutting, indexing mechanism and instrumentalities whereby the relative rolling movement automatically operates said locking means to release the blank spindle and effect a positive indexing rotation of the blank spindle independently of the rolling movement at predetermined intervals.

26. In a gear generating machine, the combination of a tool, a support, a sleeve journaled in said support, a blank spindle journaled in said sleeve, means for producing a relative movement between said tool and support and for simultaneously rotating said sleeve in opposite directions to generate the tooth profiles, means for locking the sleeve and spindle for movement together during cutting, means for releasing said locking means when the sleeve reaches a predetermined position, and means actuated by the movement of the sleeve for imparting a relative rotary motion to said spindle, when released, to index the blank.

27. In a gear generating machine, the combination of a tool, a support, a sleeve journaled in said support, a blank spindle journaled in said sleeve, means for producing a relative movement between said tool and support and for simultaneously rotating said sleeve in opposite directions, means for locking the sleeve and spindle for movement together during cutting, means for releasing said locking means when the sleeve reaches a predetermined position, and means actuated by the movement of the sleeve for imparting rotation to said spindle in a direction opposite to the movement of the sleeve to index the blank.

28. In a gear generating machine, the combination of a tool, a support, a sleeve journaled in said support, a blank spindle journaled in said sleeve, means for producing a relative movement between said tool and support and for simultaneously rotating said sleeve in opposite directions, means for locking the sleeve and spindle for movement together during cutting, means for releasing said locking means when the sleeve reaches a predetermined position, and means whereby the relative movement between the sleeve and support produces a rotary movement of the spindle relative to the sleeve, when disconnected, to index the blank.

29. In a gear generating machine, the combination with a sleeve and means for imparting an oscillatory movement thereto of a blank spindle rotatable in the sleeve, a notched disk carried by the blank spindle, a locking dog mounted on the sleeve and adapted to engage a notch of said disk during cutting, means acting automatically to disengage said dog when the sleeve has reached a predetermined position, and means actuated by the movement of the sleeve to produce a movement between the sleeve and spindle, when released, to index the blank.

30. In a gear generating machine, the combination with a generating sleeve and means for imparting an oscillatory movement thereto, of a blank spindle rotatable in the sleeve, a notched disk carried by the blank spindle, a locking dog mounted on the sleeve and adapted to engage a notch of said disk during cutting, means acting automatically to disengage said dog when the sleeve has reached a predetermined position and means actuated by the movement of the sleeve, during disconnection, to move the spindle in the opposite direction to the sleeve, to bring another notch of the disk into position for engagement by the dog to index the blank.

31. In a gear generating machine, the combination with a sleeve and means for imparting an oscillatory movement thereto of a blank spindle rotatable in the sleeve, a notched disk carried by the blank spindle, a locking dog mounted on the sleeve and adapted to engage a notch of said disk during cutting, means acting automatically to disengage said dog when the sleeve has reached a predetermined position, gearing for producing a relative movement between the spindle and sleeve, and means acting to connect said gearing to the spindle simultaneously with the disengagement of said dog to rotate the spindle relative to the sleeve to bring another notch of the disk into position for engagement by the dog, and means for disengaging said gearing when the dog is re-engaged with said disk.

32. In a gear generating machine, the combination with a sleeve and means for imparting an oscillatory movement thereto, of a blank spindle rotatable in the sleeve, a notched disk carried by the blank spindle, a locking dog mounted on the sleeve and adapted to engage a notch of said disk during cutting, means acting automatically to disengage said dog when the sleeve has reached a predetermined position, gearing for producing a relative movement between the spindle and sleeve, means acting to connect said gearing to the spindle simultaneously with the disengagement of said dog and means whereby the movement of said sleeve, during disconnection, acts automatically to actuate said gearing to rotate the spindle relative to the sleeve to bring another notch of the disk into position for engagement by the dog, and means for disengaging said gearing when the dog is re-engaged with the disk.

33. In a gear generating machine, the combination of a support, a tool, a pair of normally connected members rotatably mounted on said support, means for oscillating one of said members, gearing for producing a relative movement between said members, and devices carried by said oscillatable member and said gearing, respectively, and means arranged to engage one of said devices and control their engagement and disengagement with the other member, whereby the latter is alternately connected to said gearing and said oscillatable member.

34. In a gear generating machine, a tool mechanism, a support, a sleeve mounted for oscillation on said support, a blank spindle rotatably mounted in said sleeve, means for oscillating the sleeve, means for locking the sleeve and blank spindle for movement together during cutting, gearing mounted wholly on said support for periodically imparting a rotary movement to said blank spindle relative to said sleeve, said gearing being disconnected from said blank spindle during cutting, and means whereby the oscillatory movement of the sleeve acts automatically to disconnect the sleeve from the spindle periodically and to simultaneously connect said spindle with said gearing to index the blank.

35. In a machine of the class described, a rotatable spindle, means for oscillating the same, and means for positively rotating said spindle relative to said oscillating means during a portion of the cycle to effect an indexing movement.

36. In a machine of the class described, a rotatable spindle, an oscillating member normally connected to said spindle for driving the latter, means for disconnecting said oscillating member from said spindle during the oscillation thereof in one direction, and means for rotating said spindle while disconnected from said oscillating member.

37. In a machine of the class described, a rotatable spindle, a notched plate secured thereto, an oscillating member adjacent said plate, an index pawl on said member normally engaging said plate, means for withdrawing said pawl from said plate, and means for independently rotating said spindle to effect an indexing movement relative to said oscillating member while said pawl is withdrawn.

38. In a machine of the class described, a tool support, tool mechanism mounted thereon, a blank support, a rotatable blank spindle journaled on said blank support, an oscillating member also journaled on said blank support, a movable carriage upon which one of said supports is mounted, means for oscillating said oscillatable member in timed relation to the movement of said carriage, an index plate, a cooperating index pawl normally engaging said plate, one of said cooperating index parts being carried by said oscillating member and the other by said rotating spindle, means for withdrawing said index pawl from said plate and means for rotating said spindle relatively to said oscillating member while said pawl is withdrawn.

39. In a machine of the class described, a rotatable member, an oscillatory member, means for oscillating said oscillatory member, means for intermittently connecting and disconnecting said oscillatory member to said rotatable member, and means for rotating said rotatable member during the interval when said rotatable member is disconnected from said oscillatory member.

40. In a machine of the class described, a an indexing plate, a cooperating index plunger, means for oscillating one of said cooperating members, means for withdrawing said plunger from said plate, and means operating while said plunger is withdrawn for positively rotating the other of said cooperating members.

41. In a machine of the class described, a nonoscillatory frame, a rotatable spindle journaled in said frame, an oscillatory member also journaled in said frame, means normally connecting said oscillatory member to said rotatable spindle, means for disconnecting said spindle from said oscillatory member, and means operating while said oscillatory member is disconnected for additionally rotating said spindle relative to said nonoscillatory frame.

42. In a machine of the class described, a rotatable spindle, means for oscillating the same, and means for rotating said spindle oppositely to said oscillating means during a portion of the cycle to effect an indexing movement.

43. In a machine of the class described, a rotatable spindle, a notched plate secured thereto, an oscillating member adjacent said plate, an index pawl on said member normally engaging said plate, means for withdrawing said pawl form said plate, and means for independently rotating said spindle oppositely to the rotation of said oscillating member to effect an indexing movement relative to said oscillating member while said pawl is withdrawn.

44. In a machine of the class described, a rotatable spindle, an oscillating member, a device normally connecting said spindle and said oscillating member, and means mounted independently of said oscillating member for disconnecting said spindle from said device.

45. In a machine of the class described, a rotatable member, an oscillatory member, means for oscillating said oscillatory member, means for intermittently connecting and disconnecting said oscillatory member to said rotatable member, and means for rotating said rotatable member in a direction opposite to the rotation of said oscillatory member during the interval when said rotatable member is disconnected from said oscillatory member.

46. In a machine of the class described, an indexing plate, a cooperating index plunger, means for oscillating one of said cooperating members, means for withdrawing said plunger from said plate, and means operating while said plunger is withdrawn for rotating the other of said cooperating members in a direction opposite to the rotation of the first cooperating member.

47. In a machine of the class described, a non-oscillatory frame, a rotatable spindle journaled in said frame, an oscillatory member also journaled in said frame, means normally connecting said oscillatory member to said rotatable spindle, means for disconnecting said spindle from said oscillatory member, and means operating while said oscillatory member is disconnected for rotating said spindle relative to said non-oscillatory frame in a direction opposite to the rotation of said oscillatory member relative to said frame.

48. In a gear generating machine, the combination with a blank support, a generating sleeve oscillatably mounted thereon, and means for imparting an oscillatory motion to said sleeve, of a blank spindle rotatable within the sleeve, locking means connecting the blank spindle and sleeve during generation, means adapted to disconnect the spindle and sleeve when the sleeve reaches a predetermined position in its oscillatory movement and means for positively connecting the blank spindle with said support when the spindle and sleeve are disconnected to effect indexing of the blank.

49. In a gear generating machine, the combination with a blank support, a generating sleeve oscillatably mounted thereon, and means for imparting an oscillatory movement to said sleeve, of a blank spindle rotatable within the sleeve, locking means connecting the blank spindle and sleeve during generation, a ratchet wheel secured to the blank spindle, a pawl normally disengaged from said ratchet wheel, means adapted to disconnect the spindle and sleeve when the sleeve has reached a predetermined position and simultaneously effect engagement of said pawl with said ratchet wheel to effect indexing of the blank.

EDWARD W. BULLOCK.
GEORGE H. BRYAN.